P. K. DEDERICK.
Baling-Presses.

No. 151,203.                                  Patented May 26, 1874.

Witnesses                                      Inventor
C. W. Dederick                                 Peter K. Dederick
David DeZiere

UNITED STATES PATENT OFFICE.

PETER K. DEDERICK, OF ALBANY, NEW YORK.

IMPROVEMENT IN BALING-PRESSES.

Specification forming part of Letters Patent No. 151,203, dated May 26, 1874; application filed October 22, 1872.

*To all whom it may concern:*

Be it known that I, PETER K. DEDERICK, of Albany, in the county of Albany and State of New York, have invented certain Improvements in Baling-Presses, of which the following is a specification:

My invention consists of certain improvements in self-feeding presses for hay, &c., of the class on which I have filed applications April 22 and August 2, 1872; and consists in extending one joint of the toggles so as to form a toggle-lever, and of operating it by a crank connected to the end of said lever; and also in the automatic feed-arm, and the manner of its operation; also, in the form of the retaining guards or barbs, and the blade to trim the projecting hay as it is forced into the bale-chamber.

My machine may be used either horizontally or perpendicularly, without change, except in the position of the crank or horse power.

Figure 1:
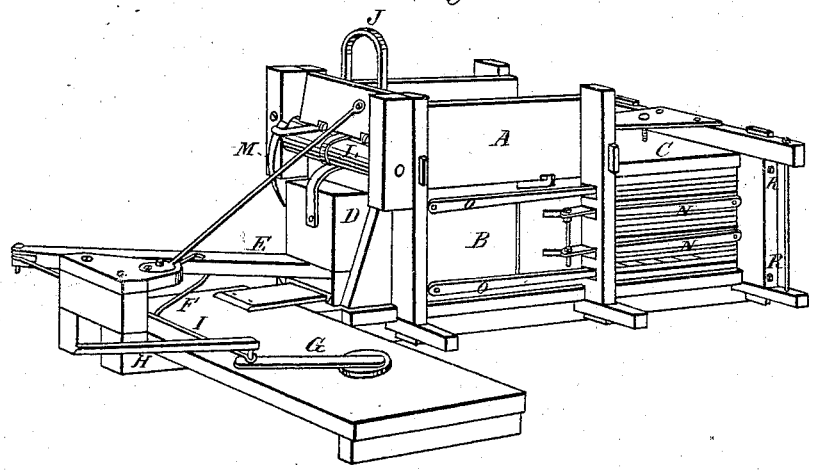
Figure 2:
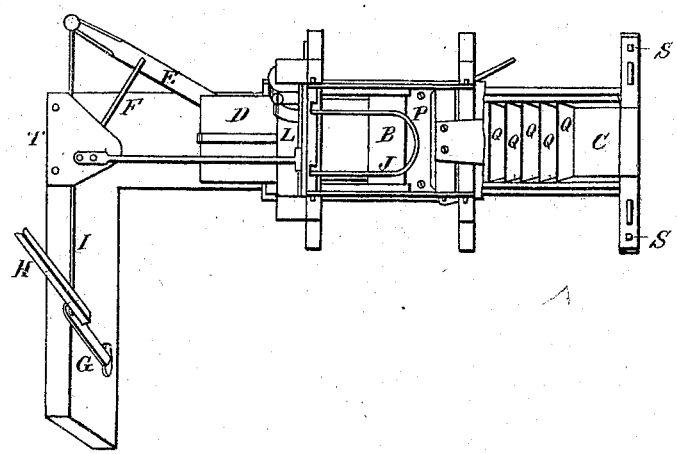

Figure 1 is a perspective view, showing the machine as horizontal. Fig. 2 illustrates the machine as upright, the entire press being the same, and with part of side or top, if horizontal, broken out.

In both figures, A is the hopper; B, the press-box; C, the bale-chamber; D, the plunger. E is a toggle-lever; F, the knees or arms; G, the crank; H, the sweep or horse-lever; and I, the connecting-rod between the horse-power and the power of the press. J is an automatic feed-arm, operated by the plunger D, through means of the roller L, which forms its bearings or journals and spring M and connections, as shown. In Fig. 1, N are spring retaining-hooks. O are equivalent spring-retainers, supporting the hay on their ends. In Fig. 2, P is the blade to trim the hay overlapping the plunger, and may be secured either to the frame or plunger, or to both. The discharge end of the press is constructed adjustably both ways, so as to admit of being screwed up to impinge the bale both ways by turning the nuts R R, Fig. 1, and S S, Fig. 2.

In operation, the hay is pitched into the hopper A, and the plunger withdrawn by the crank G through means of the toggle-lever E and connections, thus turning the roller L and moving the arm J down on the hay, and forcing it into the press-box B, from whence it is forced into the bale-chamber C by the plunger and toggle-lever, operated by the continued revolutions of the crank. The hay overlapping the plunger is cut off by the blade P, Fig. 2, thus making a smooth side to the bale. Thus the operation is continued, and the pressed sections retained from expanding back by the guards N N O O, Fig. 1, and ribs or corrugations, as shown at Q, Fig. 2, either separately or all combined. After pressing the first it is tied off in the usual manner through the slots in the box, and is then used as a head to press the next bale against, and is thus moved forward and discharged from the press.

In using this machine upright, as in Fig. 2, it is placed on the end T, this being the bottom, and S the top. If desired, the frame may be like that of the presses in ordinary use. The operation is exactly similar as when used horizontally, except that the hay is forced upward and the bale discharged from the top S, which would make it convenient for stowing the bales in high places. The feed-arm may be hinged at the upper side of the feed-orifice, if desired, in vertical presses.

Having thus described my invention, I claim as follows:

1. The feed-arm J, in combination with the plunger D and press-box B, substantially for the purpose set forth.

2. The plunger D, extended toggle or toggle-lever E, and arms F, in combination with the crank G and connection I, for the purpose set forth.

3. The blade P, in combination with the press-box A and plunger D, as shown and described.

PETER K. DEDERICK.

Witnesses:
    A. M. DEDERICK,
    DAVID DE SIERE.